(12) United States Patent
Preece

(10) Patent No.: US 9,211,804 B2
(45) Date of Patent: Dec. 15, 2015

(54) OPTIMIZATION OF EXTENDED RANGE ELECTRIC VEHICLE

(71) Applicant: Emerald Automotive LLC, Hazelwood, MO (US)

(72) Inventor: Andrew Preece, Great Cambourne (GB)

(73) Assignee: Emerald Automotive LLC, Hazelwood, MO (US)

( * ) Notice: Subject to any disclaimer, the term of this patent is extended or adjusted under 35 U.S.C. 154(b) by 0 days.

(21) Appl. No.: 14/537,632

(22) Filed: Nov. 10, 2014

(65) Prior Publication Data

US 2015/0134174 A1  May 14, 2015

Related U.S. Application Data

(63) Continuation of application No. PCT/US2013/072864, filed on Dec. 3, 2013.

(60) Provisional application No. 61/738,792, filed on Dec. 18, 2012.

(51) Int. Cl.
*B60L 11/18* (2006.01)
*H01M 10/48* (2006.01)
(Continued)

(52) U.S. Cl.
CPC .......... *B60L 11/1862* (2013.01); *B60L 11/126* (2013.01); *H01M 10/44* (2013.01);
(Continued)

(58) Field of Classification Search
CPC ............ B60L 2260/54; B60L 2260/52; B60L 11/1862; B60L 11/123; B60L 11/1861; B60L 2260/50; B60L 11/1864; B60L 11/126; H01M 10/48; H01M 10/44; H01M 2220/20; H02J 7/04; H02J 7/00; Y02T 10/7044; Y02T 10/705; Y02T 10/7005
See application file for complete search history.

(56) References Cited

U.S. PATENT DOCUMENTS

2002/0107618 A1* 8/2002 Deguchi et al. ................. 701/22
2009/0114463 A1   5/2009 DeVault
(Continued)

FOREIGN PATENT DOCUMENTS

DE   102010039653 A1   2/2012
JP   2000232703         8/2000
(Continued)

OTHER PUBLICATIONS

International Search Report and Written Opinion dated Mar. 24, 2014, issued in International Patent Application PCT/US2013/072864.

(Continued)

*Primary Examiner* — Rodney Butler
(74) *Attorney, Agent, or Firm* — Baker Hostetler LLP; Mark H. Krietzman

(57) ABSTRACT

Disclosed is a computer-implemented method and system for operating an auxiliary power unit (APU) in a range-extended electric vehicle between a minimum state of charge (SoC) limit and a maximum SoC limit of the battery pack, including predicting expected energy use profile of said vehicle; predicting change in SoC for both "APU off" and "APU on" states at a predetermined power setting corresponding to the desired optimal point (for example, the most efficient, or most powerful, or most comfortable, or lowest noise) for the specific vehicle and APU type in question; setting SoC limits for said battery pack at end of journey to minimum acceptable values based on the design and characteristics of the battery pack; and, working iteratively in reverse order from the end of journey, using "APU on" SoC values to set the minimum-limit of SoC, and "APU off" value to set the maximum-limit of SoC.

5 Claims, 10 Drawing Sheets

(51) Int. Cl.
*H02J 7/04* (2006.01)
*H01M 10/44* (2006.01)
*H02J 7/00* (2006.01)
*B60L 11/12* (2006.01)

(52) U.S. Cl.
CPC ............... *H01M 10/48* (2013.01); *H02J 7/00* (2013.01); *H02J 7/04* (2013.01); *B60L 2260/50* (2013.01); *B60L 2260/52* (2013.01); *B60L 2260/54* (2013.01); *H01M 2220/20* (2013.01); *Y02T 10/7005* (2013.01); *Y02T 10/705* (2013.01); *Y02T 10/7044* (2013.01)

(56) References Cited

U.S. PATENT DOCUMENTS

2009/0277702 A1   11/2009   Kanada et al.
2010/0211242 A1   8/2010    Kelty et al.
2012/0032637 A1   2/2012    Kotooka et al.
2012/0158227 A1*  6/2012    Tate et al. .................. 701/22
2012/0179420 A1*  7/2012    Gilman et al. .............. 702/165

FOREIGN PATENT DOCUMENTS

JP   2010195350   9/2010
JP   2012096712   5/2012

OTHER PUBLICATIONS

European Patent Application No. 13866429.7; Supplemental Search Report; dated Aug. 7, 2015; 7 pages.

\* cited by examiner

OPTIMIZATION OF EXTENDED RANGE ELECTRIC VEHICLE

CROSS-REFERENCE TO RELATED APPLICATIONS

This application is a Continuation of International patent application PCT/US2013/072864 filed Dec. 3, 2013, which claims the full Paris Convention benefit of and priority to U.S. provisional application No. 61/738,792 filed Dec. 18, 2013, the contents of which are incorporated by this reference as if fully set forth herein in their entirety.

FIELD OF THE DISCLOSED

This disclosure relates to optimization of the operation of range of a vehicle's engine to meet various criteria.

BACKGROUND

Extended-Range Electric Vehicle (EREV) are a specific type of hybrid vehicle. This type of vehicle runs on stored electrical energy, but is additionally equipped with an onboard Auxiliary Power Unit (APU), typically a small internal combustion engine (ICE) coupled to an electrical generator, which allows additional driving range when compared to a vehicle running only on stored electrical energy. U.S. Patent applications US2011/0022258A1, US2004/0074682A1, and 2011/0202216A1 and U.S. Pat. Nos. 5,264,764, 5,343,970, US Patent application number 2011/0202216A1 (Thai-Thang et al.) describe certain methods for controlling the operation of hybrid vehicles. Patent application number US2011/0022258A1 (Stopp et al.) describes a method of controlling APU operation in response to various parameters, US Patent application US2004/0074682A1 (Fussey et al.) describes a method of APU control which depends on a pre-determined algorithm for cost minimization with regard to generation of electrical energy.

DESCRIPTION

In an EREV, fuel and cost savings are related to: (1) maximizing the use of stored electrical energy as the power source in preference to fossil fuels (2) avoidance of APU engine use in low-efficiency modes: an APU can be run close to its most efficient point for most of its service life, whereas the engine in a conventional ICE vehicle must be used according to the driving cycle and road conditions and spends relatively little of its life at optimum operating point; (3) recovery of electrical energy from the vehicle under braking (regenerative braking), which helps to reduce energy loss caused by braking (which normally merely turns the kinetic energy of the vehicle into heat).

Aspects of the disclosed methods improve fuel consumption when compared to existing internal combustion engine and hybrid vehicles. This is achieved primarily by minimizing engine running time so that the energy consumed is derived as much as possible from electrical sources, which are normally lower cost, and lower in environmental impact than fossil fuel energy sources on a per-unit basis.

Aspects of the disclosed methods makes use of a combination of available data sources to predict the energy required to complete a pre-configured route, and optimizes the scheduling of APU operation around these factors.

Typically, manufacturers calibrate APU's to operate in one of two modes: (1) load-following, in which the APU takes over from the battery supply once the battery is exhausted, and then supplies energy which corresponds to the whole demands of the user; and (2) Fixed point, in which the APU is used to supplement the stored energy source and set to run at a single or multiple discreet operating points (for example, corresponding to maximum efficiency or maximum power), corresponding to the average power demand over a period of time.

The disclosed methods determine optimum state of charge (SoC) limits for switching between APU on and off states, or between different operating points, in a fixed point system. Conventional methods use fixed SoC thresholds, such that the APU is started at a specific SoC which corresponds to the minimum allowable SoC of the particular battery pack, and switched off at a single fixed higher SoC. In contrast, in one or more aspect of the disclosed methods, the SoC thresholds are modified on a continuous basis, using a prediction of energy requirements based on at least one of driving profiles and analysis of the remaining route, terrain and vehicle condition using Global Positioning System (GPS) data in conjunction with commercially available mapping data and any other remote data sources which a specific user may make available (for example, via the General Packet Radio Service).

Disclosed systems and methods herein include but are not limited to:
1. Resulting in more electrical energy being utilized to complete the journey than a EREV without the methods taught herein. In some instances, that as much electrical energy as possible is used to complete the expected journey, thus reducing the amount of energy produced by burning fossil fuels (in other words, to optimize that the battery is not at higher state of charge than is necessary). The expected fuel saving equates to the fuel required to produce the average amount of energy which might otherwise remain in the battery when the vehicle reaches its destination (normally this could be expected to be one half of the difference between the SoC limits for APU operation as described below)
2. Avoids inefficient modes of engine operation
3. Provides the capability to forbid engine operation in certain zones defined within the route plan; for example, Low Emission Zones.

Via the disclosed methods and systems herein a target minimum battery charge state coincidental with the end of a journey is taught. As a result, of minimum battery charge coinciding with journey's end cheaper and cleaner electrical energy is used to the maximum extent possible irrespective of whether the vehicle is operated in highly congested cities or on highways.

Accordingly it is a desideratum to develop optimized intelligent methods for operating electric range extender vehicles to reduce fuel consumption and pollution while maintaining the life of the battery.

Figure 1:
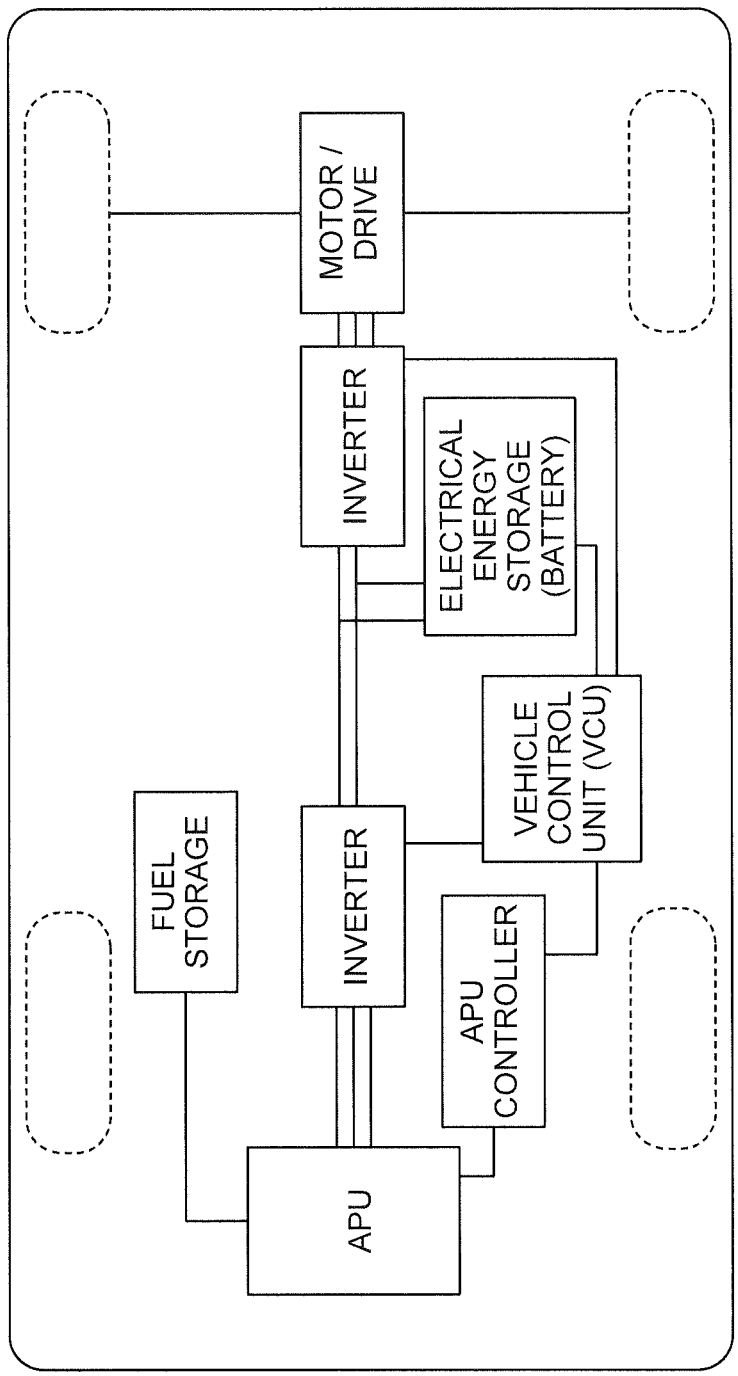
FIG. 1. shows a schematic diagram of a typical extended range electric vehicle (EREV).

All callouts in the attached figures are hereby incorporated by this reference as if fully set forth herein.

It should be appreciated that, for simplicity and clarity of illustration, elements shown in the figures have not necessarily been drawn to scale. For example, the dimensions of some of the elements are exaggerated, relative to each other, for clarity. Further, where considered appropriate, reference numerals have been repeated among the Figures to indicate corresponding elements. While the specification concludes with claims defining the features of the present disclosure that are regarded as novel, it is believed that the present disclosure's teachings will be better understood from a consideration of the following description in conjunction with the figures in which like reference numerals are carried forward.

DETAILED DESCRIPTION

Shown in an EREV (FIG. 1) is a traditional system and method for managing an EREV. Motive power is provided by an electric motor 11 coupled to one or more road wheels 12 and energy is supplied by a storage device, which is normally a battery 13, through an inverter 18 which converts dc electrical energy into ac. In order to provide a battery at an economic cost whilst permitting a driving range which is acceptable to users, the vehicle is fitted with an Auxilliary Power Unit (APU) 16, which is a source of electrical energy such as an internal combustion engine coupled to an electrical generator or a fuel cell generator. Fuel for the APU is stored in a refillable container such as a fuel tank 15. The APU is used only to generate electricity, which is converted from ac to dc electrical energy by and inverter 16 and in turn used to power the traction motor 11 and charge the battery 13. The energy flows and functional behavior of the system is controlled using electronic systems with embedded software, typically a single module known as the VCU (Vehicle Control Unit) 12. The APU is under the control of the APU Controller 17, which responds to signals from the VCU 12 to determine its status of operation.

Figure 2:
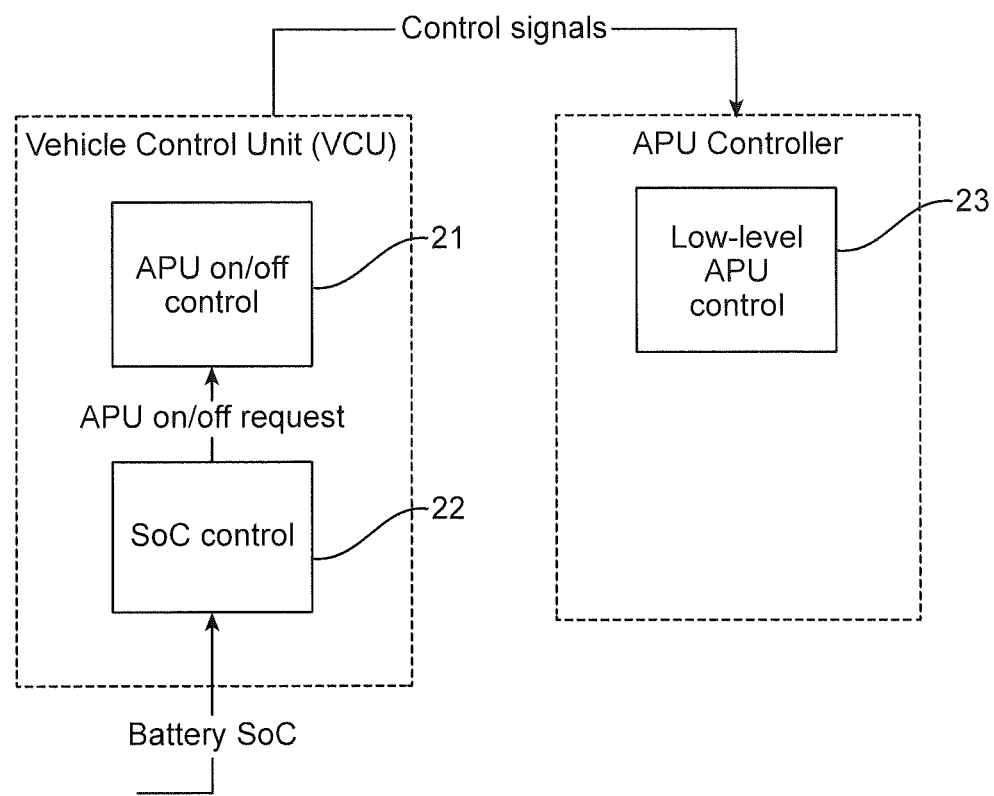
FIG. 2. shows a block diagram showing key inputs and devices in a typical EREV.

The disclosed methods utilize a novel combination of existing inputs and processes which determine an optimal schedule for the APU, thus improving overall fuel economy of the vehicle. As shown in FIG. 2, preferred embodiments of the disclosure comprises one or more onboard computing devices (typically a microcomputer and/or dedicated embedded controller/s) connected to relevant sensors as described. FIG. 2 shows the APU operating strategy of an APU in a typical EREV. The present battery state of charge (SoC) is determined and input to the VCU as an electronic signal, typically using CAN communication. A processing module labeled as the SoC control 22 compares the present SoC to predetermined limits. If the APU is not operational and the SoC goes below a predetermined value (the lower SoC limit) the SoC control 22 requests an APU start. If the APU is operational and the SoC goes above a predetermined value (the upper SoC limit) the SoC control 22 requests an APU stop.

An APC on/off control 21 processes these requests, The APU on/off control 21 generates electrical signals commanding the stopping or starting of the APU. These signals are sent to the APU controller 23, typically via Controller Area Network, which performs the low-level functions required to implement the command.

Aspects of the exemplary implementations of the present disclosure are focused on APU operating strategy. Operating strategy depends on selected state of charge (SoC) threshold(s) for APU switch on/off (for example: APU turns on at 25% SoC, switches off at 40% SoC) by a flexible SoC approach. In the disclosed methods, SoC threshold limits vary depending on specified data inputs and predictive inputs:
1. APU turns on if SoC is at or below a minimum limit; APU turns off at or above maximum limit.
2. Derive maximum and minimum State of Charge (SoC) limits, to define an operating envelope SoC based on a prediction of energy demand for each driving route or profile.
3. SoC limits may be determined by:
   a. Predicting expected energy use profile of the vehicle (from planned route distance and topology in conjunction with history of energy use, but may also use information on weather conditions, traffic conditions etc)
   b. Predicting change in SoC for both "APU off" and "APU on" at preferred power setting (with reference to the predicted energy use and energy inputs from regenerative braking)
   c. Setting limits for battery at end of journey to minimum acceptable values to avoid possible over-discharge which may lead to reduce life expectation (measured in % SoC—the exact value depending on the chemistry and design of the battery pack and its expected life).
   d. Working backwards (reverse) from the end of journey, using "APU on" SoC values to set minimum limit, and "APU off" value to set maximum limit. As the vehicle approaches the end of its journey, the maximum and minimum SoC limits tend to become closer until at the end they are at about the about same level. Values change iteratively.

FIG. 2 illustrates key aspects of a traditional the conventional APU control algorithm.

Figure 3:
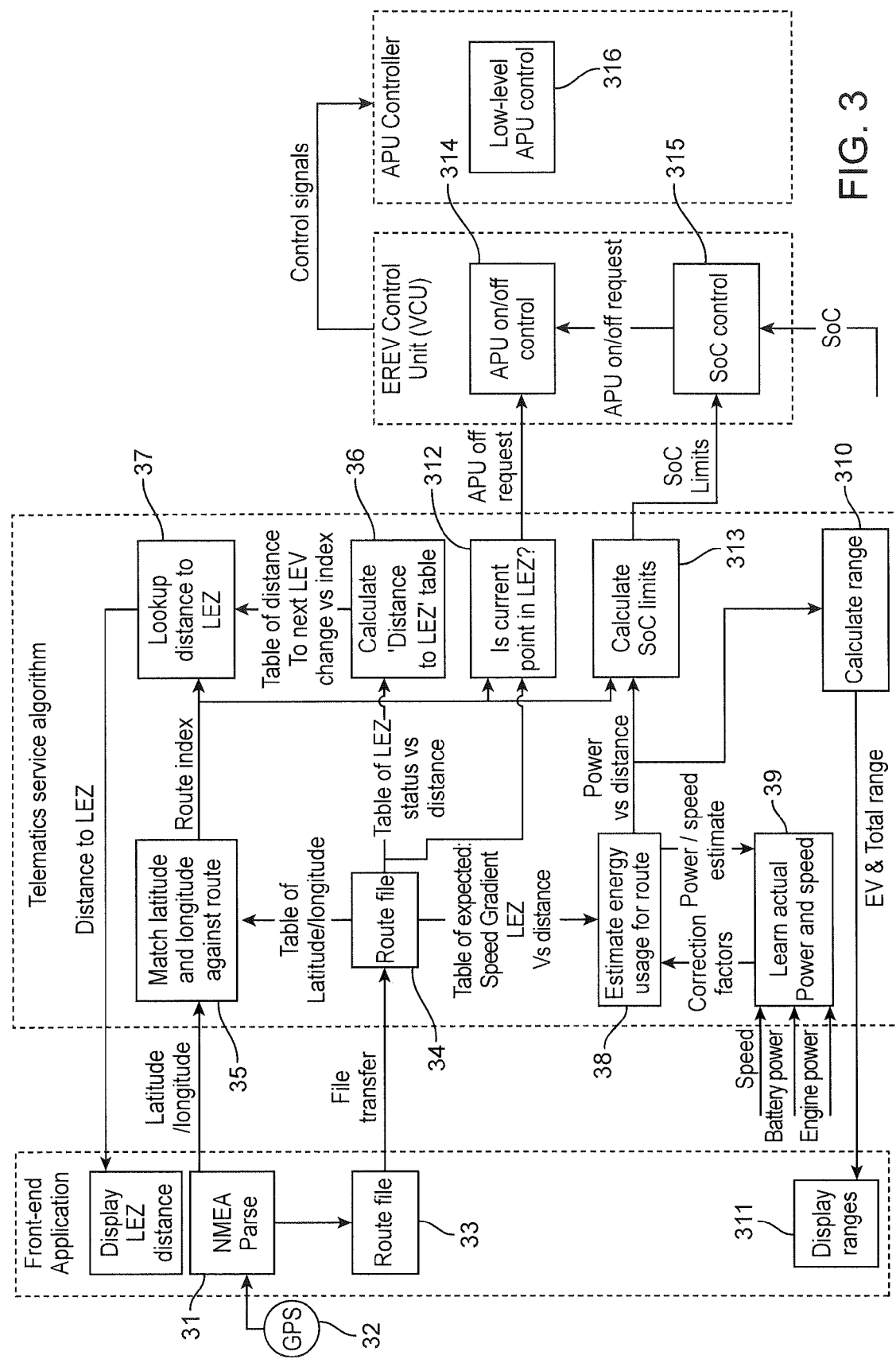
FIG. 3. shows a block diagram showing the operating protocol flow of the disclosed invention.

FIG. 3 illustrates and describes aspects of an operating scheme, system or procedure The method illustrated in FIG. 3 adds to the traditional APU control algorithm described in FIG. 2 additional calculations and comparisons which implement the variable SoC limits described above. Disclosed herein systems and methods of the operation of SoC limit controls. Those of ordinary skill in the art will recognize that FIG. 3 is but one exemplar and it can be modularized to be implemented in various configurations of hardware, for example as a single module containing all functions or in any other functional partition to suit the application and those configurations are within the scope of this disclosure.

A standard parsing routine such as the NMEA 0183 parsing routine 31 uses signals from a GPS receiver 32 to determine the position of the vehicle using standard GPS techniques. This routine provides co-ordinates for latitude, longitude and altitude.

The Route File 33 contains information on the route to be traversed by the vehicle. In this exemplar it is implemented as a Comma Separated Variable (CSV) file, which may be generated manually or automatically and details the expected position of the vehicle as it travels its expected route, in addition to any other relevant features such as Low Emission Zones (LEZ), where use of internal combustion engines is restricted or disallowed. Disallowed zones may also be referred to as zero emission zones.

The route file 33 is used by a service algorithm and may need to be copied to another location if it is physically separated from the front end (as in 34). The route file is at least one of repeatedly and continuously compared to the current location of the vehicle in 35 to determine whether the vehicle is on a prescribed route and to verify the exact coordinates of the vehicle on the route.

In one embodiment, the process presumes that the vehicle will be within 200 meters of its last known point on the route in a positive direction (in other words, it is further along the predetermined route than it was at the last known good location). If the location is not matched to within a margin of error of 35 meters in this range, then the comparison algorithm re-scans the entire route to pinpoint the location of the vehicle.

A software routine 37 dynamically calculates the difference between the vehicle's location on the route and the location of the next LEZ, calculated in 36.

The calculation of remaining electric-only range 310 uses an estimation of the energy required to complete the route 38 based on the expected speed, gradient, presence of low-emission zones and distances to be travelled, using predetermined values of energy consumption for the specific vehicle to which the system is fitted. The range calculated may be displayed to the user via the front-end application 311.

The energy estimate 38 is modified by the learn-actual routine 39, which compares the estimates which had been made for the part of the journey already completed with the energy actually used in that part of the journey and calculates the error made. A factor based on this error is then used to modify the forward estimate based on:

The factor between expected speed (in route file) and the actual speed, and difference between predicted energy (using the expected speed with the factor applied) and actual energy consumption The system assumes that the same error factor applies to the prediction as was made in the past, and updates the forward estimate by the same proportion. In this way the forward estimate is continuously improved.

The two possible outputs to the VCU are generated by the modules 312 and 313. Module 312 compares the current location of the vehicle from the matching module 35 to the route file 34 to establish whether or not the vehicle is within an LEZ. If the vehicle is within an LEZ then the module 312 sends a request to the VCU engine control 314 to switch off the APU.

Module 313 calculates the state of charge (SoC) limits which are used to switch the engine on and off. The upper state of charge limit determines the state of charge at which a running engine is switched off. The lower state of charge limit determines the state of charge at which a non-running engine is switched on. Module 313 calculates these limits by integrating the energy use prediction values, starting at the end of the journey, and working back to the current location, based on only two possible scenarios:

1. Assuming that the APU is operated at its normal operating point at all times, except when the vehicle is within an LEZ. This represents the maximum amount of energy that can be generated from the APU in normal operating mode and therefore determines the minimum required state of charge of the battery at any point—since it should not be necessary to have more energy than is contained in the battery plus the contribution of the APU, to complete the journey. This calculation defines the point at which the APU should be switched on if it is not already running 2. Assuming that the APU is not run at all. This represents the minimum amount of energy that can be generated from the APU and therefore determines the maximum state of charge at any point—subject to the physical limits of the battery technology which may override the calculated value (since it may not be physically possible to reach the target without using the APU). This calculation defines the point at which the APU should be switched off if it is already running Modules 314, 315 and 316 are similar to modules 21, 22 and 23 in FIG. 2 and perform similar functions in this scheme.

REPRESENTATIVE EXAMPLES

Figure 4:
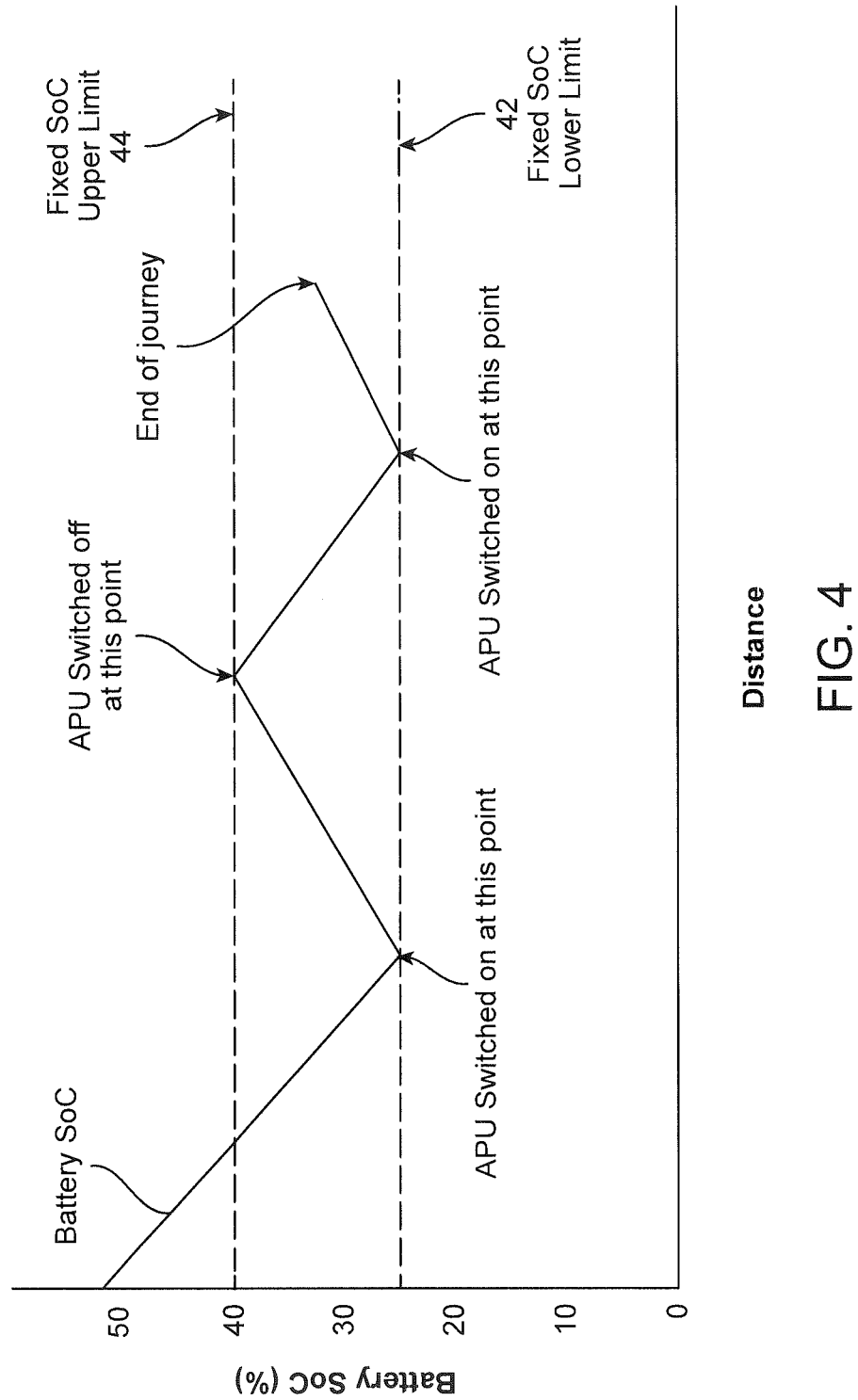
FIG. 4. is an operating profile showing SoC states in a conventional EREV.

To illustrate, consider a case where the vehicle is approaching its target with the range extender engine running in the conventional mode in FIG. 4. The vertical axis of the graph represents to battery state of charge (SoC) and the horizontal axis represents distance in meters, although the values shown are exemplary only. The vehicle in this example starts a particular journey with a battery SoC around 50%, and as the vehicle proceeds the SoC 41 decreases in approximate proportion to the distance travelled. At around 2000 meters the battery SoC falls to a level where it is equal to the fixed SoC lower limit 42, at which point 43 the APU will be switched on to provide additional range to the vehicle. As the vehicle runs with the APU switched on the battery SoC will normally rise as the output of the APU if correctly sized will exceed the average power demand of the vehicle in normal use. At around 3500 meters the SoC has risen to a point 45 where it is equal to the fixed SoC upper threshold 44 and the APU is switched off. The SoC then starts to fall again until it reaches the lower threshold at point 46 where the APU is switched on again. Without the use of the disclosed methods, the battery's state of charge is increasing as the APU is supplying energy, until the end of the journey is reached 47. In this case the battery SoC at the end of the journey is higher than necessary, as the desired SoC 48 is equal to the minimum threshold (corresponding to the point at which the maximum energy required to complete the journey has been supplied by stored electrical energy rather than use of the APU, which is less efficient) and the vehicle will thus have used more fuel than is required to reach its destination.

Figure 5:
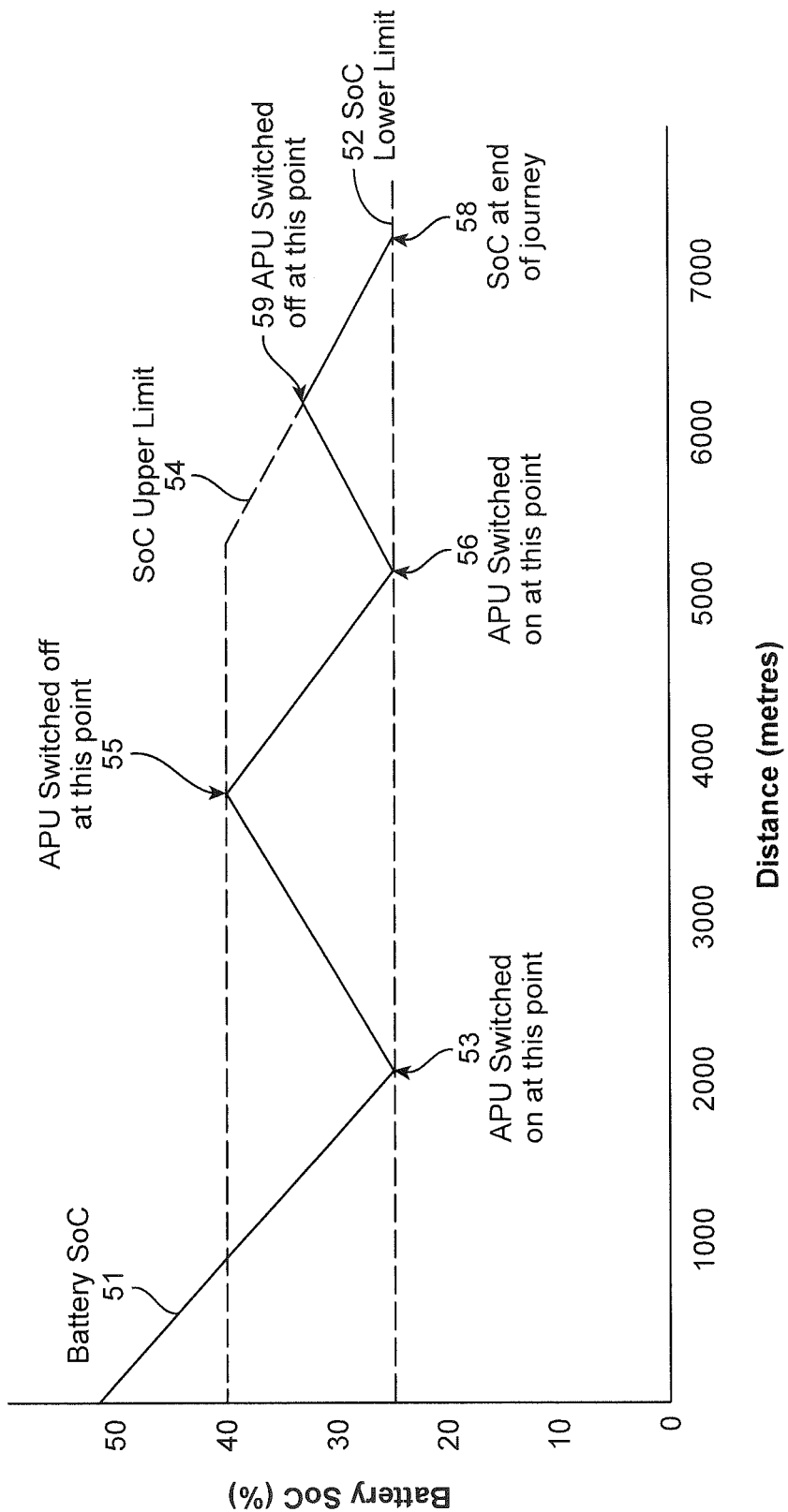
FIG. 5. is an operating profile showing SoC states in an EREV run using the disclosed methods.

When the disclosed range extender engine is running under the methods herein, the SoC limits are intentionally variable under the control of the methods described above as shown in FIG. 5. The SoC behaves in the same way up to around 5000 meters into the journey. As the vehicle approaches its target end of journey, the maximum SoC limit 54 will decrease as shown since the energy required to complete the journey based on an assumption of full APU use is reducing as the target approaches. At the point 59 where the actual SoC and maximum limit are exactly the same the range extender engine will switch off. The vehicle then completes its journey using battery energy only, ending close to (or at) the minimum battery SoC permitted at point 58. Those SoC values are iteratively altered. The saving in fuel made (by substituting battery energy) is the same as the fuel which would have been consumed in the final part of the journey after the APU turns off. For example, if the vehicle consumes 0.1 liters of fuel for every 1 km of distance covered when the APU is running, the saving in this instance would be the fuel which would have been consumed between points 59 and 58, which is 0.1 liters since the distance is 1 km.

Figure 6:
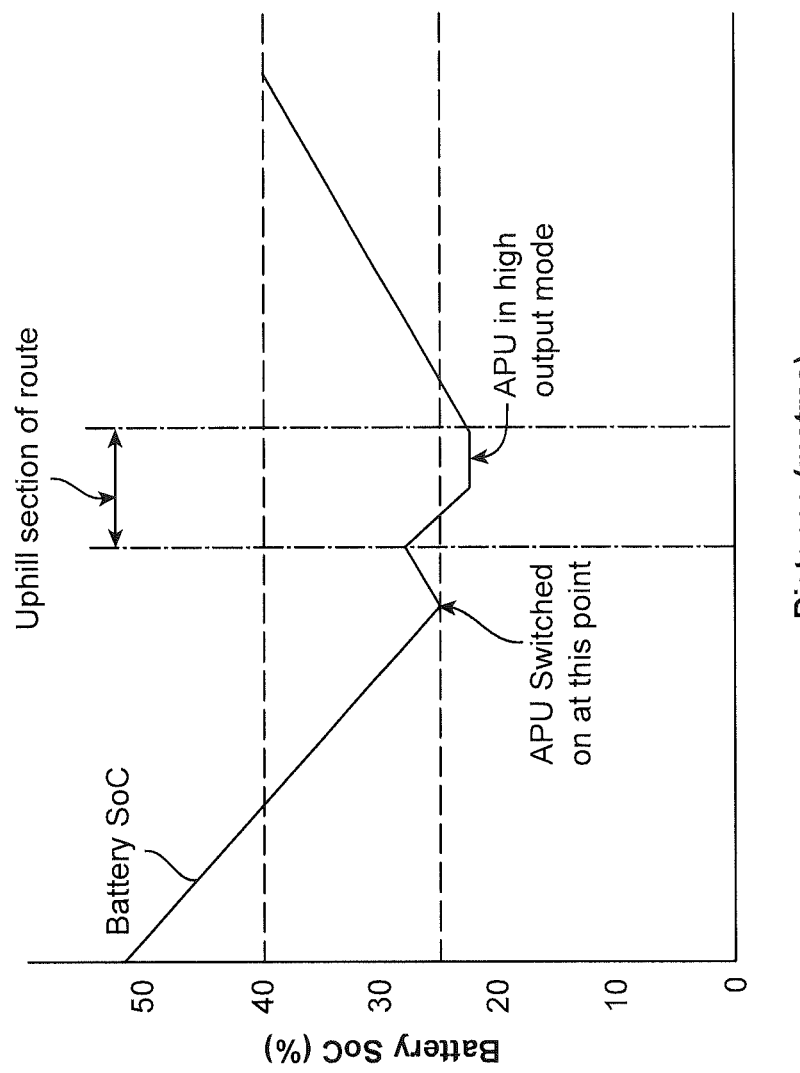
FIG. 6. shows an operating profile of a conventional EREV while climbing a hill.

In some exemplary implementations aspect are disclosed of predicting system inputs from gradients, avoiding inefficient use modes of the APU (typically at very high output power) and/or excess use of the APU if regenerative braking is anticipated since this may provide the required energy input to the system. FIG. 6 shows APU behavior for a system without the present invention in which the route includes gradients which lead to increased power demand or the recovery of excess energy through regenerative braking.

As the vehicle travels the first 2000 m, the behavior is similar to that noted in the previous example and the APU is started as the SoC matches the fixed lower limit at point 63. After switching on the APU, the vehicle encounters an uphill stretch of the journey marked as 64. During this phase of high power demand the normal output from the APU may not be sufficient and this would cause a demand on the APU above its normal efficient operating range (typically, for an internal combustion engine, at an operating point of maximum power, rather than maximum efficiency which is the preferred mode). As the uphill section is passed, the vehicle returns to a normal operating mode as before with the APU running. The SoC then increases as the vehicle runs on level ground in a similar way to the behavior illustrated in FIG. 4. The APU is switches off as the SoC reaches the fixed upper limit, but at this point the vehicle encounters a downhill section of sufficient gradient to enable harvesting of regenerative energy by using its traction motor as a generator, thus braking the vehicle and charging the battery. The upper SoC threshold has no effect as the APU is already in the "off" state, and the SoC will rise as the vehicle descends the gradient. The last part of the journey depletes the battery SoC as expected, but the vehicle returns to its base with usable energy still in the battery and thus can be considered to have used more fuel to power the APU than was necessary to complete the journey.

Figure 7:
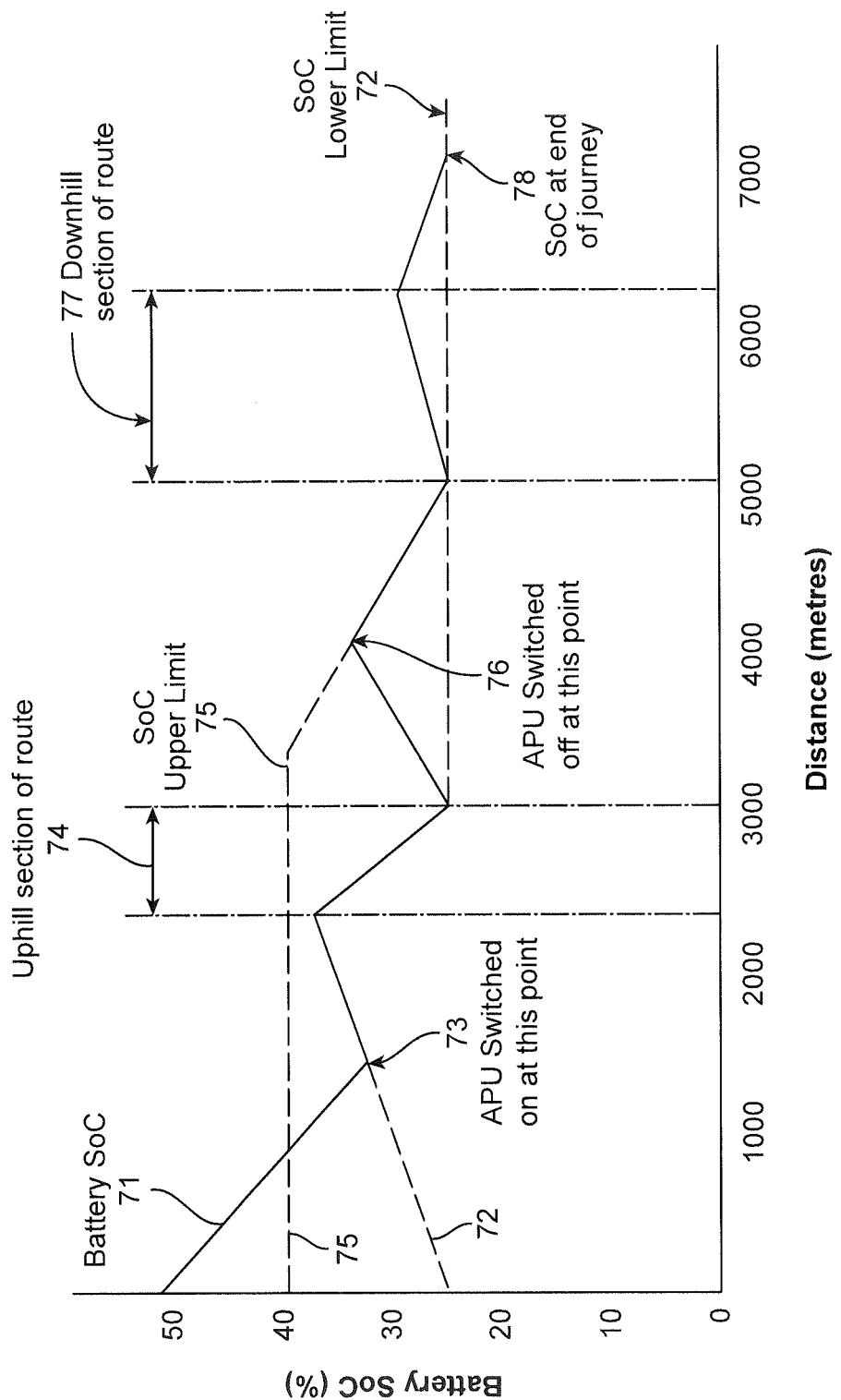
FIG. 7. Is an operating profile of an EREV running using the disclosed methods while climbing a hill.

Methods and systems shown in FIG. 7 illustrate how an anticipated uphill gradient causes the future energy demand prediction to increase, and the minimum SoC 72 will correspondingly increase, since the APU will be unable to provide sufficient power to achieve the hill climb without assistance from the battery. This causes the SoC to equal the minimum SoC threshold earlier than in FIG. 6, at point 73, which has the effect of building up sufficient charge in the battery to power the vehicle up the hill without use of high-power APU modes.

As the vehicle continues to climb, the minimum SoC starts to decrease, since the future energy prediction decreases to the level where the journey could be completed using the energy produce by continuous running of the APU in normal mode. When the vehicle approaches the downhill section of the journey, the maximum state of charge will start to decrease, since the energy recovered by regenerative braking contributes to the electrical energy available and the prediction for energy required to complete the journey without use of the APU will decrease. This causes the APU to be switched off earlier than the example shown in FIG. 6, since the SoC equals the maximum SoC threshold at point 76. The energy recovered during the downhill section of the route has been included in the predicted energy required to complete the journey, and the SoC at the end of the journey is thus close to the minimum allowed SoC as desired.

Figure 8:
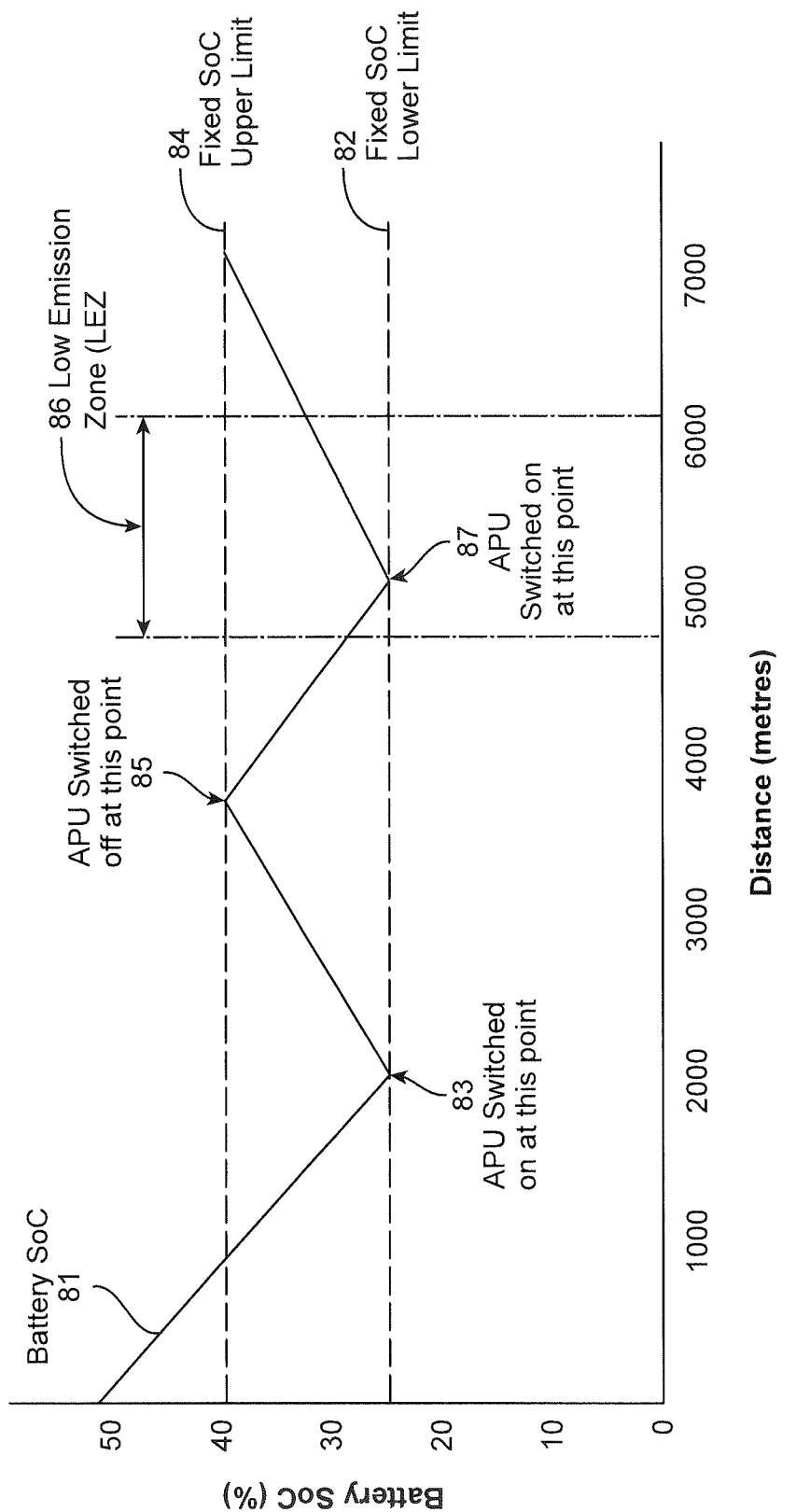
FIG. 8 is an operating profile of a conventional EREV through a zone where emissions are penalized.
Figure 9:
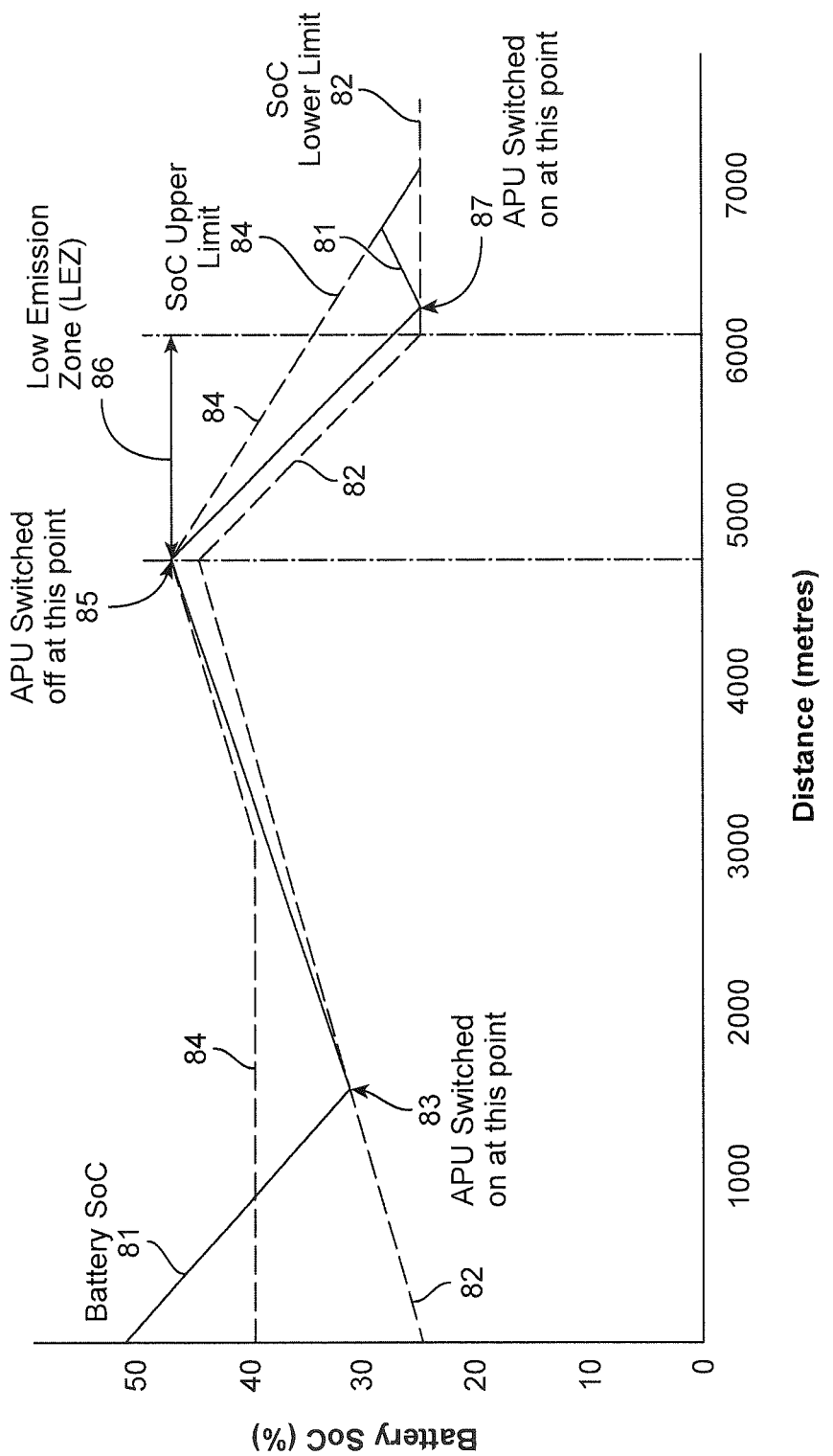
FIG. 9 is an operating profile of an EREV running using the disclosed methods through a zone where emissions are penalized.

A Low Emission Zone, such as a pollution-limited zone such as in city centers, is an area where penalties are assessed upon vehicles which emit pollutants in certain geographical areas. Such city centers are found in some European countries. In the case of a conventionally-controlled (traditional) system, the amount of charge in the battery as it crosses the LEZ may not be sufficient to avoid use of the APU in the zone as is illustrated in FIG. 8. Therefore when the LEZ area is reached, there is insufficient battery charge to complete the distance required, so that point 87 the APU is switched on and the vehicle emits pollutants, and thereby may be assessed a penalty.

In contrast vis-a-vis the disclosed methods and systems herein the minimum SoC threshold 82 begins to rise as the vehicle approaches the LEZ as the computer system utilizing processors and memory apply rule and decision engines to decide the impact of the lack of energy from the APU throughout that zone. The maximum 84 and minimum 82 SoC limits tend to the same point as the LEZ 86 begins (as the calculation for "APU on" is nearly the same as for "APU off") and the SoC 81 closely follows this calculation, ensuring that the SoC is sufficient to allow the vehicle to cross the LEZ without use of the APU. The next point of operation of the APU at 87 occurs outside of this zone. The decisions are made in real time or near real time and the variables considered are multifold and changing including, but not limited to, GPS data.

Figure 10:
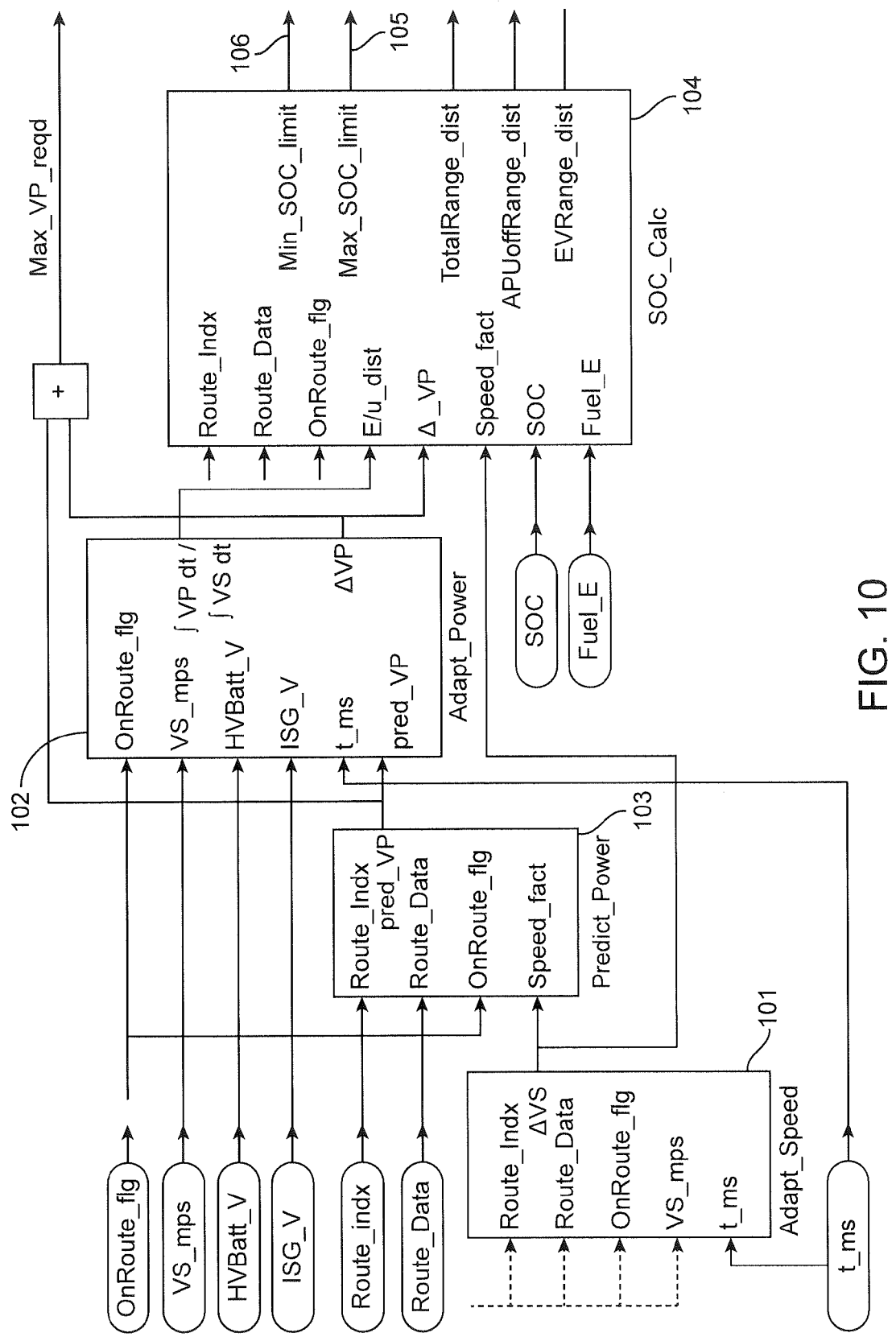
FIG. 10 shows a schematic diagram of mathematical calculations required to determine the APU operating limits in the disclosed method.

FIG. 10 depicts the core components of the decisioning process of the supervisory control computer applying the algorithm that continuously predicts the energy requirement for the intended route, from the current location at the sampled time step, and determines appropriate State Of Charge (SOC) limits for the battery and the distance to the next state change (on or off) for the APU.

For each time step the 'Adapt_Speed' block 101 computes the difference between suggested vehicle speed from the proscribed route file (the posted speed limit for the road segment) and the current actual vehicle speed in order to provide a continuously updating speed adjustment factor $\Delta VS$. The 'Adapt_Power' block 102 provides a similar function computing the difference between a predicted power requirement pred_VP and the actual traction power available for the current time step.

The predicted power requirement is multi variable and is derived, at least in part, from a combination of the vehicle's sensor data, GPS data, and the map data from the proscribed route according to the following algorithm:

Predict Power Function 103:

Estimate Vehicle Tractive Power (VP) from:

$$VP = \text{Traction Force} \times \text{Vehicle Speed} = F \times VS$$

Where the traction Force is that to overcome the combined effects of;
a) the aerodynamic drag, $$Fa = \frac{1}{2}\rho CdAsv^2$$

(the density of air, coefficient of drag, exposed frontal area and the vehicle's velocity)
b) the rolling resistance, $Fr = CrrW$
   (the coefficient of rolling resistance and the download force or weight over the wheels)
c) the gradient of the road, $Fa = mg \sin(\alpha)$
   (the total mass of the vehicle, the gravitational force and the incline angle in radians)
d) the vehicle's inertial resistance, $Fi = ma$
   (the total mass of the vehicle and its acceleration)

As with the posted speed limits, the incline angle of the gradient of each road segment is taken from the map data associated with the proscribed route. If the gradient is negative and regenerative braking is enabled then the above is corrected according to the portion of regenerative energy captured. A further adjustment for the efficiency of the inverter and the traction motor, based on a continuous internal measurement, is also applied.

The Adapt_Power block also computes the Energy per Unit Distance (E/u_dist) by integrating the calculated vehicle power and speed for each time step.

The 'State of Charge Calculator' (SOC_Calc) 104 provides a continuous update for the maximum SoC limit 105 and minimum SoC limit 106 (between which the APU is commanded to run) required to ensure that the vehicle is able to complete the route, including the traversal of any Low Emissions Zones (LEZs), traversal of zero emission zone wherein emissions from the APU are disallowed, avoiding the use, where possible, of the APU in high power mode and only using the APU in normal power, recharge mode, outside of any LEZs, when necessary to complete the intended route. This is achieved by calculating the maximum possible range in EV mode along the proscribed route assuming a constant rate of acceleration, adherence to speed limits, and accounting for the gradient of the road segments and the internal losses of the drive-train. If the route cannot be completed in EV mode, then the amount of extra charge required to complete the route, assuming the APU is running at maximum efficiency, is calculated and by integrating backward from the end of the route to the point where is required to start running (the minimum SOC, or APU_on, limit) and assuming a safe minimum state of charge to protect the battery's long term operations. The maximum SOC, or APU_off, limit is the highest SOC at which, even if the APU is not run at all for the remainder of the route, it is still possible to deplete the battery to the minimum limit by the end of the route. If the route traverses a LEZ, then the SOC limits for APU_on and APU_off are adjusted to compensate for distance/time to pass through the LEZ.

The invention claimed is:

1. A computer-implemented method for operating an auxiliary power unit (APU) in an extended-range electric vehicle (EREV) between a minimum state of charge (SoC) limit and a maximum SoC limit of a battery pack, the method comprising:
predicting expected energy use profile of a vehicle;
predicting change in SoC for both "APU off" and "APU on" states at a predetermined power setting corresponding to the desired optimal point for the specific vehicle and APU type in question;
setting SoC limits for said battery pack at end of a journey to minimum acceptable values based on the design and characteristics of the battery pack; and,
working iteratively in reverse order from the end of the journey, using "APU on" SoC values to set the minimum-limit of SoC, and "APU off" value to set the maximum-limit of SoC;
wherein said predicting expected energy use profile of the vehicle is determined by calculating the maximum possible range in electric vehicle (EV) mode along a proscribed route;
wherein said predicting expected energy use assumes a substantially constant rate of acceleration and substantial adherence to speed limits.

2. The method of claim 1 wherein said predicting expected energy use places a value on the gradient of road segments and the internal losses of a drive-train.

3. A computer-implemented method for operating an auxiliary power unit (APU) in an extended-range electric vehicle (EREV) between a minimum state of charge (SoC) limit and a maximum SoC limit of a battery pack, the method comprising:
predicting expected energy use profile of a vehicle;
predicting change in SoC for both "APU off" and "APU on" states at a predetermined power setting corresponding to the desired optimal point for the specific vehicle and APU type in question;
setting SoC limits for said battery pack at end of a journey to minimum acceptable values based on the design and characteristics of the battery pack; and,
working iteratively in reverse order from the end of the journey, using "APU on" SoC values to set the minimum-limit of SoC, and "APU off" value to set the maximum-limit of SoC;
wherein said predicting expected energy use profile of the vehicle is determined via the vehicle's sensor data, GPS data, and the map data from the proscribed route;
wherein said predicting expected energy use profile of the vehicle is determined according to the following algorithm:

$$\text{estimate Vehicle Tractive Power } (VP) \text{ from Traction Force} \times \text{Vehicle Speed};$$

wherein said Traction Force is the force to overcome the combined effects of:
a) the aerodynamic drag, Fa equal to one half times the density of air times the coefficient of drag times the exposed frontal area times the vehicle's velocity squared;
b) the rolling resistance, Fr equal to the coefficient of rolling resistance times the download force or weight over the wheels;
c) the gradient of the road, Fa equal to the total mass of the vehicle times the gravitational force times the incline angle in radians; and,
d) the vehicle's inertial resistance, Fi equal to the total mass of the vehicle times the vehicle's acceleration.

4. A computer-implemented method for operating an auxiliary power unit (APU) in an extended-range electric vehicle (EREV) between a minimum state of charge (SoC) limit and a maximum SoC limit of a battery pack the method comprising:
predicting expected energy use profile of a vehicle;
predicting change in SoC for both "APU off" and "APU on" states at a predetermined power setting corresponding to the desired optimal point for the specific vehicle and APU type in question;
setting SoC limits for said battery pack at end of a journey to minimum acceptable values based on the design and characteristics of the battery pack; and,
working iteratively in reverse order from the end of the journey, using "APU on" SOC values to set the minimum-limit of SoC, and "APU off" value to set the maximum-limit of SoC;
wherein said predicting change in SoC for both "APU off" and "APU on" at preferred power setting is accomplished with reference to the predicted energy use and energy inputs from regenerative braking.

5. A computer-implemented method for operating an EREV to provide adequate SoC to minimize use of an Auxiliary Power Unit (APU) and flexible to complete a journey with the SoC being at a predefined level when an end target is obtained, the method comprising:
a vehicle control unit (VCU) in an EREV turns on an APU if battery SoC is at or below a minimum limit and turns off the APU if the SOC is at or above maximum limit to provide for the energy requirements of the EREV;
during the journey, applying a decisioning process to dynamically predict expected energy requirements of the EREV defining an operating envelope SoC wherein predicted energy use profile of the vehicle takes account of at least a zero emission on route and performs the decisioning assuming the APU is not run in the zone;

based on a prediction of energy demand for each driving as the EREV approaches the end of journey the maximum and minimum SoC limits become closer until at the end the maximum and minimum SoC limits are at the same level; and, SoC limits are determined by predicting change in SoC for both "APU off" and "APU on" from predicted energy use and energy inputs from regenerative braking.

* * * * *